US010171824B2

(12) United States Patent
Liu et al.

(10) Patent No.: US 10,171,824 B2
(45) Date of Patent: Jan. 1, 2019

(54) SYSTEM AND METHOD FOR ADAPTIVE FRAME RE-COMPRESSION IN VIDEO PROCESSING SYSTEM

(71) Applicant: MEDIATEK INC., Hsinchu (TW)

(72) Inventors: Tsu-Ming Liu, Hsinchu (TW); Yung-Chang Chang, New Taipei (TW); Chi-Cheng Ju, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/638,888

(22) Filed: Jun. 30, 2017

(65) Prior Publication Data

US 2017/0302941 A1    Oct. 19, 2017

Related U.S. Application Data

(63) Continuation of application No. 13/420,632, filed on Mar. 15, 2012.

(51) Int. Cl.
*H04N 19/44* (2014.01)
*H04N 19/61* (2014.01)
(Continued)

(52) U.S. Cl.
CPC ......... *H04N 19/428* (2014.11); *H04N 19/105* (2014.11); *H04N 19/156* (2014.11);
(Continued)

(58) Field of Classification Search
None
See application file for complete search history.

(56) References Cited

U.S. PATENT DOCUMENTS 6,208,689 B1 * 3/2001 Ohira ............... H04N 19/159
375/240.03
8,665,955 B2    3/2014 Bourge et al.
(Continued)

FOREIGN PATENT DOCUMENTS

CN    1965585    5/2007
CN    101208954    6/2008
(Continued)

OTHER PUBLICATIONS

International Telecommunications Recommendation ITU-T H.264 (Mar. 2010).
(Continued)

*Primary Examiner* — William C Vaughn, Jr.
*Assistant Examiner* — Lindsay J Uhl
(74) *Attorney, Agent, or Firm* — Oblon, McClelland, Maier & Neustadt, L.L.P.

(57) ABSTRACT

Method and system of video decoding incorporating frame compression to reduce frame buffer size are disclosed. The method adjusts parameters of the frame compression according to decoder system information or syntax element in the video bitstream. The decoder system information may be selected from a group consisting of system status, system parameter and a combination of system status and system parameter. The decoder system information may include system bandwidth, frame buffer size, frame buffer status, system power consumption, and system processing load. The syntax element comprises reference frame indicator, initial picture QP (quantization parameter), picture type, and picture size. The adaptive frame compression may be applied to adjust compression ratio. Furthermore, the adaptive frame compression may be applied to a decoder for a scalable video coding system or a multi-layer video coding system.

18 Claims, 7 Drawing Sheets

(51) Int. Cl.
  *H04N 19/105* (2014.01)
  *H04N 19/156* (2014.01)
  *H04N 19/159* (2014.01)
  *H04N 19/172* (2014.01)
  *H04N 19/426* (2014.01)

(52) U.S. Cl.
  CPC ......... *H04N 19/159* (2014.11); *H04N 19/172* (2014.11); *H04N 19/44* (2014.11); *H04N 19/61* (2014.11)

(56) References Cited

U.S. PATENT DOCUMENTS

| | | |
|---|---|---|
| 8,908,774 B2 | 12/2014 | Yu |
| 2002/0001343 A1 | 1/2002 | Challapali |
| 2007/0195882 A1 | 8/2007 | Tichelaar et al. |
| 2007/0204320 A1 | 8/2007 | Wu et al. |
| 2009/0122870 A1* | 5/2009 | Sadowski ............ H04N 19/176 375/240.24 |
| 2009/0196348 A1 | 8/2009 | Masterson et al. |
| 2011/0249723 A1 | 10/2011 | Wasily |

FOREIGN PATENT DOCUMENTS

| | | |
|---|---|---|
| CN | 102158693 | 8/2011 |
| EP | 1 292 154 | 3/2003 |
| WO | WO 99/16253 A1 | 4/1999 |
| WO | WO 2005/088983 A2 | 9/2005 |
| WO | WO 2005/122587 A1 | 12/2005 |

OTHER PUBLICATIONS

Li, Gwo-Long, et al., A 135 MHz 542 k Gates High Throughput H.264/AVC Scalable High Profile Decoder (Oct. 10, 2011) (http://ieeexplore.ieee.org/xpls/abs_all.jsp?arnumber=641017).

Chono (Chair) Ketal; "JCT-VC AHG report: Memory compression", 94. MEPG Meeting, Oct. 11, 2010-Oct. 15, 2010: Guangzhou; (Motion Picture Expert Group or ISO/IEC JTC1/SC29/WG11). No. M18047.Oct. 28, 2010 (Oct. 28, 2010), XP030046637.

European Search Report, EP 12 00 4503, dated Sep. 27, 2012.

* cited by examiner

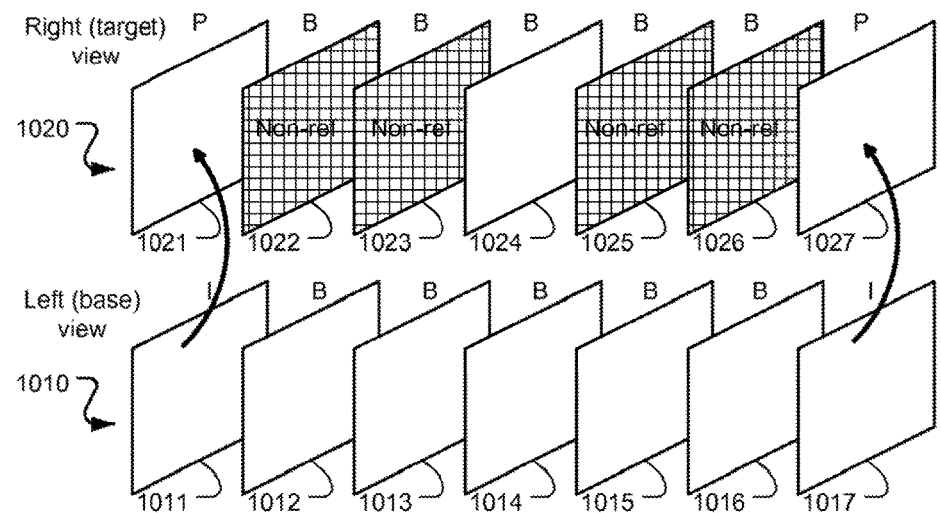
*Fig. 10*
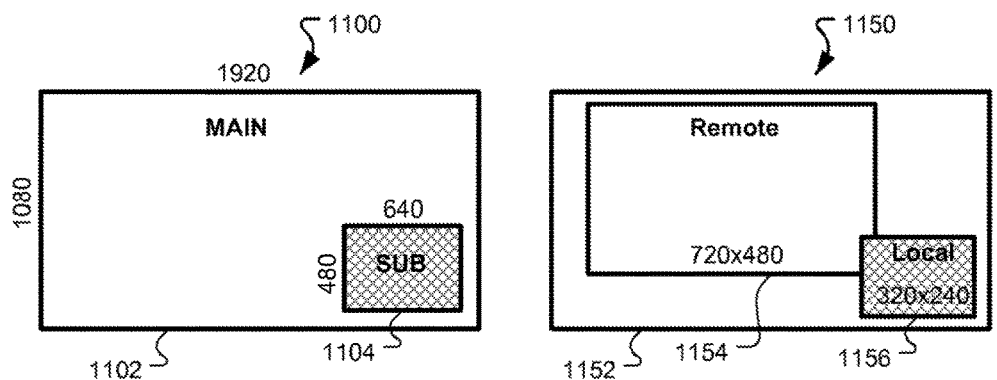
*Fig. 11A*   *Fig. 11B*

SYSTEM AND METHOD FOR ADAPTIVE FRAME RE-COMPRESSION IN VIDEO PROCESSING SYSTEM

CROSS-REFERENCE TO RELATED APPLICATION

This application is a continuation of and is based upon and claims the benefit of priority Under 35 U.S.C. § 120 for U.S. application Ser. No. 13/420,632, filed Mar. 15, 2015, the entire contents of this application is incorporated herein by reference.

FIELD OF THE INVENTION

The present invention relates to video processing system. In particular, the present invention relates to system and method for adaptive frame re-compression in video processing system.

BACKGROUND

Motion-compensated inter-frame coding has been widely used in various international video coding standards, such as MPEG-1/2/4, H.264/AVC and the emerging HEVC (High Efficiency Video Coding) standard. In an inter-frame coding system, the motion information is derived using one or more reference frames, where the reference frame may be a frame before or after the current frame in the display order. The reference frame used for motion estimation/compensation is always a previously reconstructed frame so that the encoder and the decoder can perform motion compensation accordingly with little or no side information. At the encoder side, frame buffer is used to store one or more reference frames in order to perform motion compensation. At the decoder side, frame buffer is used to store one or more reference frames in order to perform motion compensation as well as to provide the decoded frames in display order. Usually, a DRAM (Dynamic Random Access Memory) is used to implement the frame buffer in a video processing device, such as a video encoder or a video decoder, regardless of whether the video processing device is implemented in a manner of hardware-based, software-based, or hybrid-based.

In older video standards such as MPEG-1/2, one or two reference frames are often used. However, in more advanced coding systems such as AVC/H.264 or the emerging High Efficiency Video Coding (HEVC) system, more reference frames may be used. The size of the frame buffer increases along with the number of reference frames. Furthermore, the size of the frame buffer will also grow with the picture size. For High Definition Television (HDTV) signals, the picture resolution is about six times of the resolution for a standard definition TV signal. Therefore, it is desirable to reduce the storage requirement associated with reference frames. Accordingly, various frame compression techniques have been reported in the literature. The frame compression techniques reported in the literature always use fixed compression ratio for each reference frame. Often, lossy compression is used for frame compression in order to achieve higher degree of data reduction. The noise introduced by lossy frame compression will degrade quality of the reconstructed video. Depending on the nature context of the reference frame, the noise in a reference frame may have different impact on the video quality. For example, the noise in an I-frame may cause more severe quality degradation than a P-frame or a B-frame. Nevertheless, conventional frame compression does not take into consideration of the nature of reference frames. Accordingly, it is desirable to develop an adaptive frame compression technique that can adaptively adjust coding parameters associated with frame compression according to the nature of the reference frame. Furthermore, other information about the underlying video as indicated in the syntax of the bitstream and decoder system information may also be useful for frame compression control.

BRIEF SUMMARY OF THE INVENTION

A method of video decoding incorporating frame compression to reduce frame buffer size is disclosed. According to one embodiment of the present invention, the method comprises receiving a video bitstream; decoding the video bitstream to generate reconstructed video data; and applying frame compression to the reconstructed video data to generate compressed-reconstructed video data for storage, wherein control of the frame compression is responsive to decoder system information, one or more syntax elements in the video bitstream, or a combination of the decoder system information and said one or more syntax elements in the video bitstream. The decoder system information may comprise system status, system parameter or a combination of both. The decoder system information may comprise system bandwidth, frame buffer size, frame buffer status, system power consumption, and system processing load. The syntax element may comprise reference frame indicator, initial picture QP (quantization parameter), picture type, picture size, or any combination of the above syntax elements indicated in sequence or picture levels. The control of the frame compression comprises frame compression algorithm selection, frame compression parameter adjustment, and frame compression enabling. The adaptive frame compression may be applied to adjust compression ratio. Furthermore, the adaptive frame compression may be applied to a decoder for a scalable video coding system or a multi-layer video coding system.

A system of video decoding incorporating frame compression to reduce frame buffer size is disclosed. According to one embodiment of the present invention, the system comprises a video decoder module operable to generate reconstructed video data from a video bitstream; a frame compression module operable to generate compressed-reconstructed video data from the reconstructed video data, wherein control of the frame compression module is responsive to decoder system information, one or more syntax elements in the video bitstream, or a combination of the decoder system information and said one or more syntax elements in the video bitstream; and a storage module operable to store the compressed-reconstructed video data. Furthermore, the system may include a system monitor module to determine the decoder system information.

BRIEF DESCRIPTION OF THE DRAWINGS

FIG. 10 illustrates an example of adaptive frame compression control for a decoder in a multi-view video coding system FIGS. 11A-B illustrate examples of adaptive frame compression control for a decoder in a multi-stream video coding system.

DETAILED DESCRIPTION OF THE INVENTION

Figure 1:
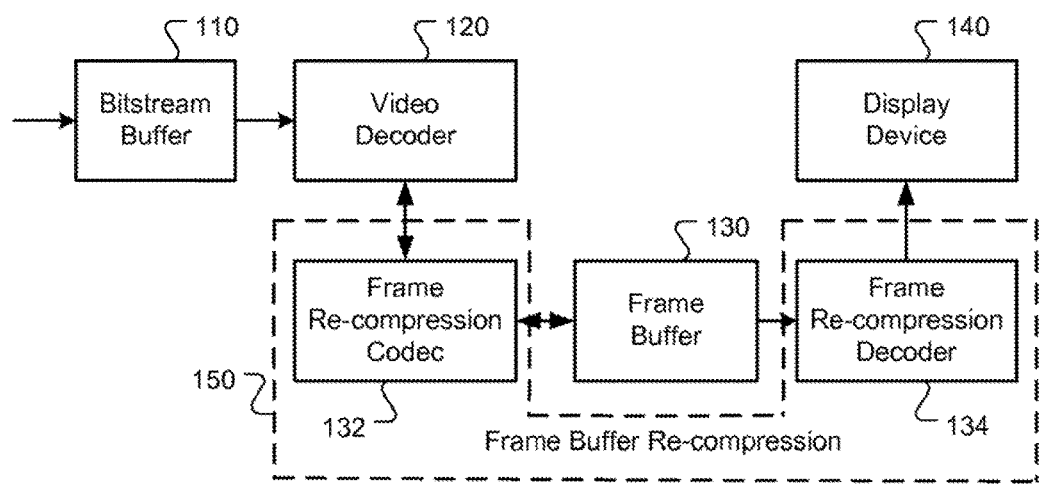
FIG. 1 illustrates an exemplary video decoder incorporating frame compression to reduce memory and bandwidth required associated with reference frame buffer.

FIG. 1 illustrates an exemplary video decoder incorporating frame compression to reduce memory and bandwidth required associated with reference frame buffer. Video decoder 120 receives bitstream from bitstream buffer 110. After video data is reconstructed by decoder 120, the reconstructed video data may have to be stored in the frame buffer. For example, the currently reconstructed video data may be used as reference frame by a later processed frame. In another example, the currently reconstructed video data cannot be outputted for display yet if the reconstructed video data for a frame in a prior display order is not ready. Therefore, there is a need for storing reconstructed video data in frame buffer. For a decoder incorporating frame compression, the reference frame in frame buffer 130 is stored in a compressed format. A frame compression encoder with a corresponding decoder (codec) 132 is used for storing frame data in a compressed form and retrieving the compressed frame data. Frame compression for reference frames is also called frame re-compression in some literature since frame compression is applied to decoded video data. In other words, the decoded video data is re-compressed again. In this disclosure, these terms, frame compression and frame re-compression, are used interchangeably. When the decoder needs to access the compressed frame data, the compressed reference data is decompressed by the decoder portion of frame re-compression codes 132 and then provided to the decoder. Compressed frame buffer can be used to store a frame for display. The compressed frame will be decoded by frame re-compression decoder 134 and then provided to display device 140 for display. In one embodiment, the display device 140 includes a post processing module for processing the video data (e, g, resolution adjustment, picture quality adjustment, or OSD combination etc.) to be displayed. In other embodiment, the display device 140 further includes a screen for receiving the video data outputted from the post processing module and displaying it on the screen. The modules in dashed-box 150 indicate exemplary components required to support frame compression in a video decoder system. The reconstructed video data compressed by frame re-compression codec 132 is referred to as compressed-reconstructed video data in this disclosure. The frame decompression is applied to the compressed-reconstructed video data. The decompressed data for the compressed-reconstructed video data is referred to as recovered-reconstructed video data in this disclosure.

Figure 2A:
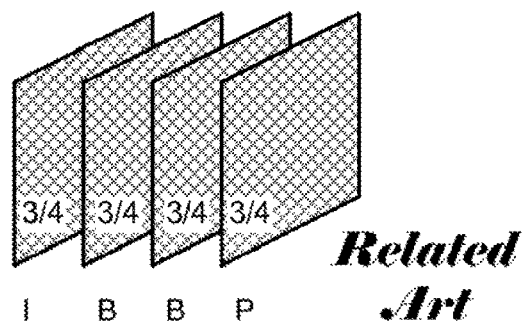
FIG. 2A illustrates an example of a subgroup of pictures consisting of an I-frame, a P-frame and two B-frames.
Figure 2B:
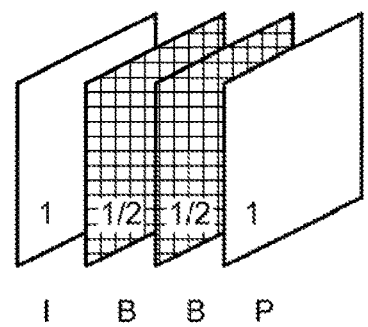
FIG. 2B illustrates an example of adaptive frame compression according to the present invention.
Figure 2C:
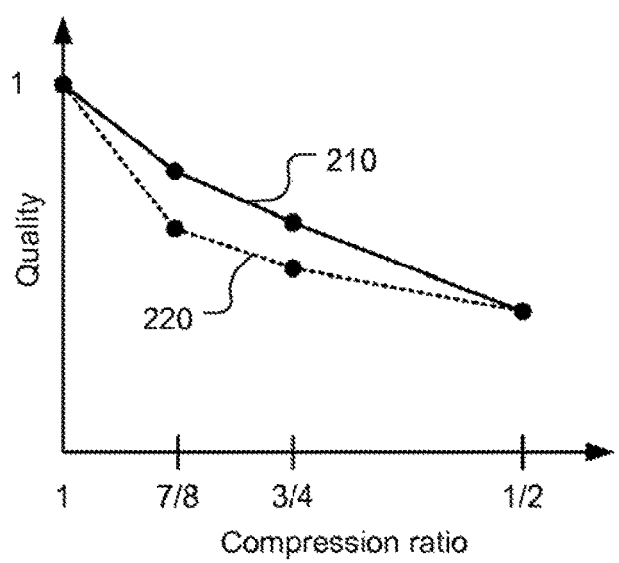
FIG. 2C illustrates exemplary performance comparison between a decoder incorporating adaptive frame compression and a decoder using conventional frame compression.

In a conventional frame compression, a fixed compression ratio has always been used for all reference frames. FIG. 2A illustrates an example of a subgroup of pictures consisting of an I-frame, a P-frame and two B-frames. If the overall compression ratio is 3/4, conventional frame compression will apply the same compression ratio, 3/4 to all frames. In the above example, the P-frame uses the I-frame as a reference frame for motion-compensated reconstruction. The B-frames use the I-frame and the P-frame as reference frames for motion-compensated reconstruction. Neither B-frame is relied upon by any other frame for reconstruction. Therefore, any degradation introduced by frame compression in the I-frame will propagate to the P-frame and the B-frames. Similarly, degradation introduced by frame compression in the P-frame will propagate to the B-frames. In other words, the noise introduced by frame compression in an I-frame will have bigger impact on overall system quality than the P-frame and the B-frame. Also, the noise introduced by frame compression in the P-frame will have bigger impact on overall system quality than the B-frame. Therefore, improved system performance may be achieved by allocating less data reduction to the I-frame and more data reduction to the B-frame. FIG. 2B illustrates an example of adaptive frame compression according to the present invention. Instead of allocating the same compression ratio to all frames, an embodiment according to the present invention applies no compression (i.e., compression ratio=1) to the I-frame and the P-frame and uses compression ratio, 1/2 for both B-frames. The average compression ratio is still 3/4 as before. In the example of FIG. 2B, some reference frames are not compressed while others are compressed more than those based on conventional frame compression. However, the video quality will be improved due to adaptive frame compression. FIG. 2C illustrates exemplary performance comparison between a decoder incorporating adaptive frame compression and a decoder using conventional frame compression. The quality is shown in a relative scale, where a scale of 1 refers to quality without frame compression. Curve 210 indicates exemplary performance for a decoder with adaptive frame compression according to an embodiment of the present invention to improve the performance and curve 220 indicates performance for a decoder using conventional frame compression.

Figure 3A:
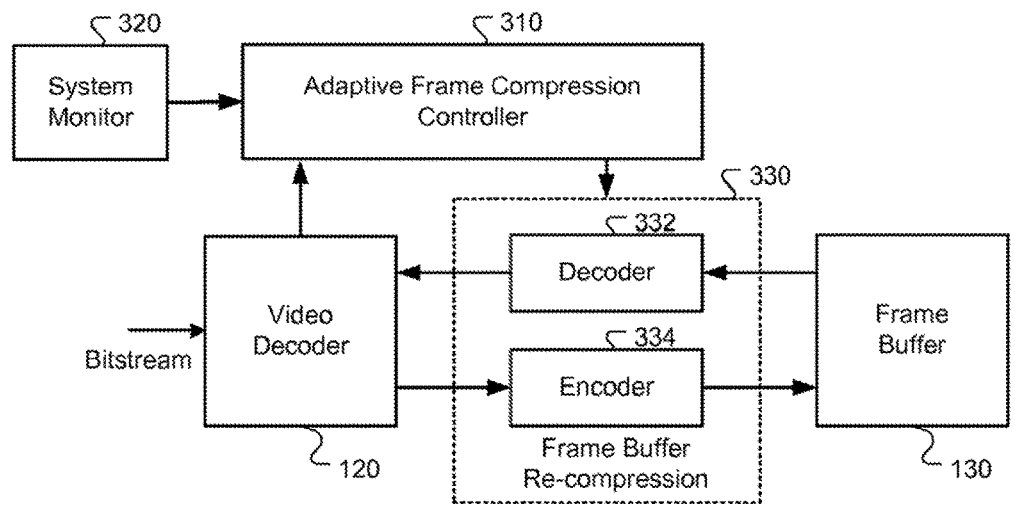
FIG. 3A illustrates an exemplary system block diagram for a decoder incorporating an embodiment according to the present invention for adaptive frame compression control to improve compression quality.

The simple example in FIG. 2B is used to illustrate the benefit of adaptive frame compression based on picture type of the reference frame. The picture type information is readily available from the syntax in the video bitstream. Adaptive control for frame compression can be based on information available from the decoder and/or information extracted from the decoder system. An exemplary block diagram incorporating an embodiment according to the present invention is shown in FIG. 3A. Adaptive frame compression controller 310 is used to receive information from the decoder system and to provide coding parameters for frame compression to improve compression quality. The information received from decoder 120 can be syntax elements derived from the bitstream. While picture type (I, P and B) is used as an example in FIG. 2B, other decoded syntax elements can be used. Furthermore, decoder system status and system parameters may also be used for deriving adaptive control for frame compression to improve compression performance. System monitor 320 can be used to monitor or determine system status and system parameters. Frame compression parameters determined by adaptive controller 310 are provided to frame re-compression codec 330 to adjust coding parameters of frame compression. Frame re-compression codec 330 comprises frame buffer encoder 334 and frame buffer decoder 332. Reference data reconstructed by video decoder 120 is processed by frame buffer encoder 334 before the reference data is written into frame buffer 130. When reference data is accessed by video decoder 120, the compressed reference data in frame buffer 130 will be decompressed by frame buffer decoder 332 before the compressed reference data is provided to video decoder 120.

Figure 3B:
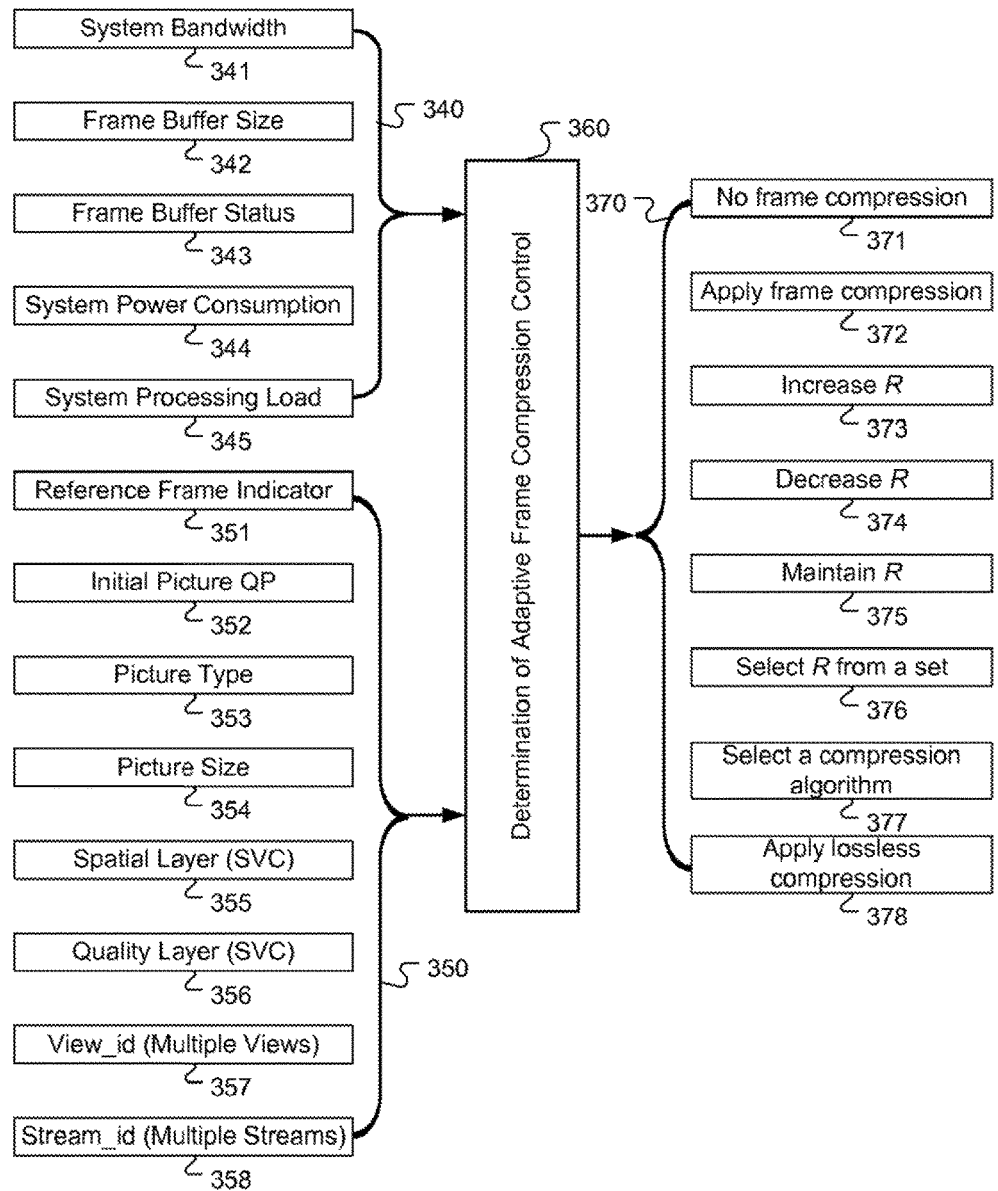
FIG. 3B illustrates an example of a flowchart to determine frame compression control based on system status/parameter and decoder syntax elements in accordance with embodiments of the present invention.

FIG. 3B illustrates an example of a flowchart to determine frame compression control based on system status/parameter and decoder syntax elements in accordance with embodiments of the present invention. Determination of adaptive frame compression control 360 receives system status/parameter input 340 from system monitor 320. Determination of adaptive frame compression control 360 may also receive decoder syntax element input 350 from video decoder 120. Alternatively, determination of adaptive frame compression control 360 may receive both system status/parameter 340 and decoder syntax element input 350. Determination of adaptive frame compression control 360 will generate frame compression control information 370 for adaptive frame compression to achieve better compression quality. System status and parameter is useful for determining frame compression parameters. For example, a decoder system usually adopts system bus architecture to interconnect processing components and system memory. The system memory may be implemented using DRAM and frame buffer can be stored in the DRAM. Access to frame buffer memory usually consumes a significant portion of the available system bandwidth. Some frames may consume more system bandwidth than others. For example, a B-frame may refer to two reference frames and will consume more DRAM bandwidth during reconstruction. Therefore, it may be desirable to reduce system bandwidth by using frame compression or to decrease compression ratio to further reduce system bandwidth if frame compression is already used. Accordingly, information associated with system status/parameter such as system bandwidth 341, frame buffer size 342, frame buffer status 343, system power consumption 344, and system processing load 345 may be used as the system status/parameter for adaptive frame compression. If the decoder system allocates a smaller frame buffer size, the adaptive frame compression control will select smaller compression ratios to accommodate the smaller frame buffer size. On the other hand, during the periods that the buffer status indicates high buffer occupancy, the adaptive frame compression control can select smaller compression ratios, i.e. more compression, to avoid buffer overflow. The adaptive frame compression control may also checks the system power consumption or system processing load to determine whether to apply frame compression. If the system already suffers high system power consumption or high system processing load, the system may avoid frame compression if possible. The elements in the system status/parameter set may be used individually for adaptive frame compression control. Alternative, two or more elements in the system status/parameter set may be jointly used for adaptive frame compression control. The system status/parameter set listed in FIG. 3B is used to illustrate some exemplary elements of the system status/parameter set useful for adaptive frame compression control to achieve better compression quality. These elements of the system status/parameter set listed in FIG. 3B should not be construed as limitations to the present invention. A skilled person may include other elements related to the system status/parameter to practice the present invention.

During video coding process, the encoder will generate various syntax elements to incorporate into the video bitstream. The decoder will recover the syntax elements from the video bitstream and use the syntax elements for the process of video reconstruction. For example, picture type (I-, P-, or B-frame) is often incorporated in the bitstream to indicate the picture type. Various bitstream syntax elements may be useful for adaptive frame compression. For example, reference frame indicator 351 indicating whether the frame will be referenced, initial picture QP (quantization parameter) 352 indicating the initial QP for a picture, picture type 353, picture size 354, spatial layer 355 for scalable video coding, quality layer 356 for scalable video coding, view_id 357 in a multiple view system and stream_id 358 in a multiple stream system can be used for adaptive frame compression control. The bitstream syntax elements may be used individually for adaptive frame compression control. Alternative, two or more bitstream syntax elements may be jointly used for adaptive frame compression control. The bitstream syntax elements listed in FIG. 3B are used to illustrate some examples useful for adaptive frame compression control to achieve better compression quality. These bitstream syntax elements should not be construed as limitations to the present invention. A skilled person may include other bitstream syntax elements to practice the present invention.

FIG. 3B illustrates some exemplary control signals for frame compression to improve the compression quality. The exemplary control signals in FIG. 3B include no frame compression 371, apply frame compression 372, increase compression ratio (R) 373, decrease R 374, maintain R 375, select R from a set 376, select a compression algorithm 377 and apply lossless compression 378. While compression ratio is mentioned in FIG. 3B as a coding parameter associated with adaptive frame compression control, it is understood that the compression ratio adjustment for frame compression is achieved by adjusting other parameters intrinsic to a frame compression technique. For example, if frame compression is based on transform coding, the quantization step size or quantization parameter for the transform coefficients is an effective method to adjust compression ratio. To achieve a desired compression ratio, a bit allocation scheme or a bitrate control scheme may have to be used, where the bit allocation scheme or the bitrate control scheme is well known in the art and details are not repeated here.

Figure 4:
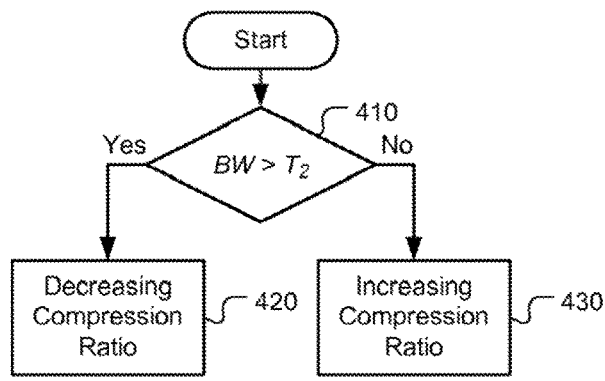
FIG. 4 illustrates a flowchart corresponding to an example of adaptive frame compression based on system bandwidth.

FIG. 4 illustrates a flowchart corresponding to an example of adaptive frame compression based on system bandwidth. System bandwidth BW is compared with threshold $T_2$ in step 410. If the system bandwidth exceeds threshold $T_2$, in step 420, the compression ratio is decreased; otherwise the compression ratio is increased in step 430. The flowchart in FIG. 4 illustrates one example of adaptive frame compression based on system bandwidth to improve compression quality according to one embodiment of the present invention. A skilled person may practice the present invention by modifying or adding more steps associated with adaptive frame compression control based on system status/parameters. For example, in the above example, when bandwidth is not greater than threshold $T_2$, an additional test can be performed to check whether BW is greater than threshold $T_3$, where $T_2>T_3$. If the condition $T_2 \geq BW>T_3$ is true, the compression ratio stays the same; otherwise the compression ratio is increased. More thresholds may be used to divide the bandwidth into more intervals and a corresponding compression ratio may be assigned to each interval. As mentioned previously, other elements of the system status/parameter set such as frame buffer size allocated, buffer occupancy of frame buffer, system power consumption, system processing load, and other parameters associated with bandwidth, power consumption and processing load may also be used for adaptive frame compression control to improve compression quality.

FIG. 2B illustrates an example of adaptive frame compression based on frame type. Various syntax elements derived from the bitstream at the decoder can be used for adaptive frame compression control to improve compression quality as well. For example, syntax elements, nal_ref_idc, pic_init_qp_minus26, pic_width_in_mbs_minus1, pic_height_in_map_units_minus1 and level_idc, used in the H.264/AVC standard can be used for adaptive frame compression to improve compression quality. Syntax element nal_ref_idc is an NAL (Network Abstraction Layer) level syntax defined in H.264/AVC. When nal_ref_idc is equal to 0, it indicates that the associated frame is a non-reference frame, which means the pixel data will not be referenced by the subsequent frames. Therefore the error drift caused by frame compression will not propagate into other frames and, consequently, more compression (i.e., lower compression ratio) can be applied to such frames. Syntax pic_init_qp_minus26 is a picture level syntax associated with initial quantization parameter (QP) for the underlying picture. A larger QP implies that the underlying picture contains more low-frequency contents and is more suited for frame compression. Accordingly, a smaller compression ratio can be applied to pictures having larger QP. Syntax elements pic_width_in_mbs_minus1, pic_height_in_map_units_minus1 and level_idc, are sequence level syntax. Syntax elements pic_width_in_mbs_minus1 and pic_height_in_map_units_minus1 are associated with picture size. Larger pictures will require more frame buffer space and are candidates for more compression. Accordingly, smaller compression ratio may be used for larger pictures. Syntax profile_idc and level_idc indicate the profile and level for pictures associated with the sequence and can be used for adaptive frame compression to improve compression quality. From aforementioned H.264/AVC video standard as an example, the embodiment of this invention can be applied to various video standards as well including but not limited to: MPEG-1/2/4, H.261/2/3, WMV/VC-1, AVS, VP6/8, etc.

Figure 5:
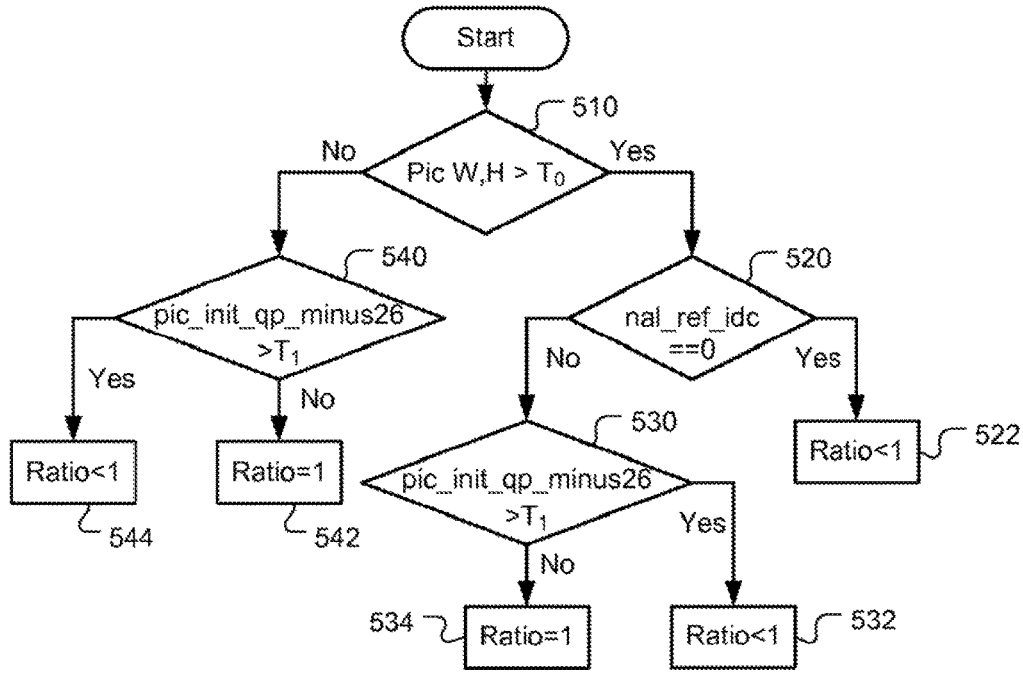
FIG. 5 illustrates an exemplary flowchart for a decoder incorporating adaptive frame compression control based on bitstream syntax elements in H.264/AVC.

FIG. 5 illustrates an exemplary flowchart of adaptive frame compression control based on syntax elements derived at the video decoder 120 to improve compression quality. The picture width and the picture height are checked against first threshold $T_0$ in step 510. If the picture width and the picture height are larger than first threshold $T_0$, the syntax element nal_ref_idc is checked in step 520. If it is a non-reference frame (nal_ref_idc=0), frame compression is applied in step 522; otherwise a further test is performed to determine whether pic_nit_qp_minus26 is greater than first threshold $T_1$ as shown in step 530. If pic_init_qp_minus26 is greater than first threshold $T_1$, frame compression is applied (step 532); otherwise frame compression is not applied (step 534). If the test result in step 510 is false, a further test is performed to determine whether pic_init_qp_minus26 is greater than first threshold $T_1$ as shown in step 540. If the test result in step 540 is true, frame compression is applied (step 544); otherwise frame compression is not applied (step 542). The exemplary flowchart shown in FIG. 5 illustrates an embodiment according to the present invention to improve frame compression quality. A skilled person in the field may practice the present invention of adaptive frame compression to improve the frame compression quality by modifying the above flowchart. For example, the steps may be re-arranged, more steps may be included, or some steps may be skipped.

Figure 6:
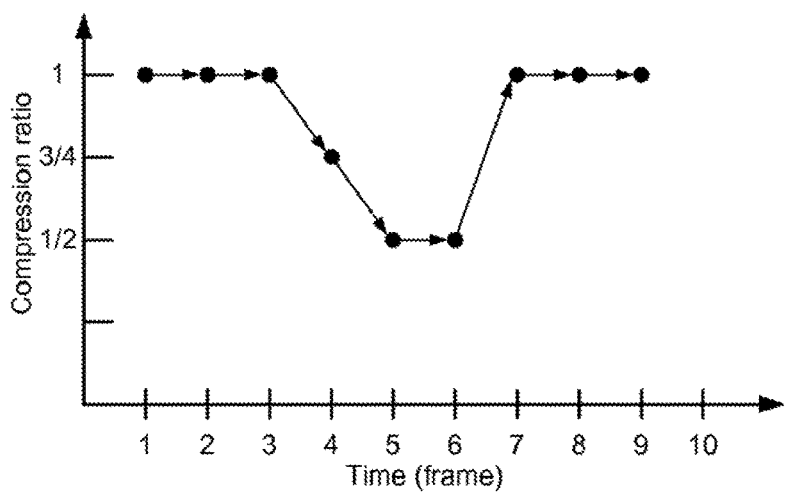
FIG. 6 illustrates an example of compression ratios for frames in a decoder incorporating adaptive frame compression control.

The frame compression control based on system status/parameter as shown in FIG. 4 and bitstream syntax elements as shown in FIG. 5 is applied to a video processing device to decode a bitstream incorporating an embodiment according to the present invention. The resulted compression ratios for the initial frames are shown in FIG. 6, where compression ratio with a value of 1 indicates no frame compression applied. For the first three frames (1, 2 and 3), no frame compression is applied. For frames 4, 5 and 6, compression ratios 3/4, 1/2, and 1/2 are applied respectively. For frames 7, 8 and 9, no frame compression is applied. The compression ratio is adaptively adjusted based on the particular adaptive frame compression control used and the characteristics of the underlying bitstream to improve frame compression quality. In a decoder incorporating conventional frame compression, the compression ratio is always fixed. While compression ratio with a value of 1 indicates no frame compression for maintaining full quality of the underlying reference frame, lossless compression may be used instead.

Figure 7:
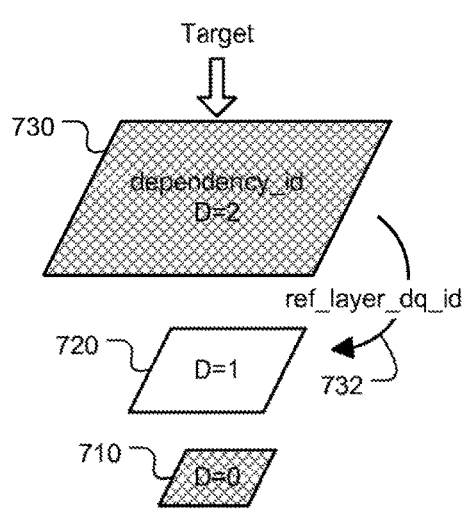
FIG. 7 illustrates an example of adaptive frame compression incorporating an embodiment according to the present invention.

An embodiment of the present invention can also be applied to a decoder for a multi-layer coding system such as a scalable video coding (SVC) system or a multi-view video coding (MVC) system. In a multi-layer coding system, the underlying video is represented in multiple layers, and inter-layer prediction is used for efficient video coding. Reconstruction of a higher layer picture using inter-layer prediction will refer to a lower layer picture. Therefore, the lower layer picture has to be stored in buffer if this lower layer picture will be used by a higher layer picture later. Scalable video coding may provide spatial scalability where a lower spatial resolution picture can be reconstructed initially and higher resolution pictures may be reconstructed with additional data received in the bitstream. A spatially scalable picture structure is shown in FIG. 7, where the scalable picture structure consists of three spatial picture layers. The lowest layer 710 is indicated by dependency_id, D=0, the second layer 720 is indicated by dependency_id, D=1 and the third layer 730 is indicated by dependency_id, D=2. If picture at a lower layer picture is used by other layer for reconstruction, the noise generated by frame compression at the lower layer will propagate to higher layers. Therefore, it is beneficial to select better picture quality (larger compression ratio) for a lower layer picture that a higher layer picture relies on it for reconstruction.

FIG. 7 illustrates an example of adaptive frame compression incorporating an embodiment according to the present invention. The shaded pattern indicates that the picture is compressed using frame compression. As shown in example of FIG. 7, third layer 730 is the target picture to be displayed. Therefore, any noise due to frame compression in third layer picture 730 will not affect picture quality of other layers. Therefore, frame compression is applied to third layer picture 730 as indicated by the shaded pattern. For the first layer and the second layer picture, both pictures may be base picture used by other layer for reconstruction. A base picture that is used by a picture in other layer for reconstruction can be determined from syntax element ref_layer_dq_id, where the current dependency_id=ref_layer_dq_id indicates that the layer is used by other layer for reconstruction. If the layer is used by other layer for reconstruction, the layer will not be compressed in order to preserve picture quality. Accordingly, second layer picture 720 is not compressed since it is referred by third layer picture 730 as indicated by arrow 732. On the other hand, first layer picture 710 is compressed. FIG. 7 illustrates an example of adaptive frame compression based on spatial layer of a scalable video coding system by applying no compression to the second layer and applying frame compression to the first and the third layers. Nevertheless, the specific method of deriving compression ratio for various layers in this example shall not be construed as limitations to the present invention. A skilled person may practice the present invention by providing different frame compression control based on the spatial layer of the scalable video coding system. For example, the first layer may be slightly compressed, the second layer may be uncompressed and the third layer may use a lower compression ratio than the first layer.

Figure 8:
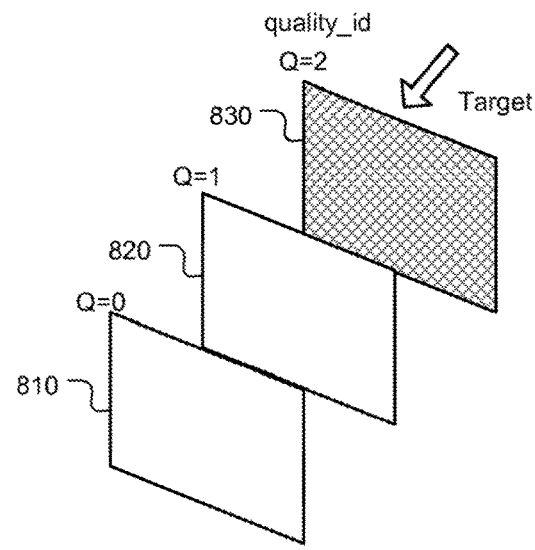
FIG. 8 illustrates an example of adaptive frame compression incorporating an embodiment according to the present invention.

A quality scalable picture structure is shown in FIG. 8, where the scalable picture structure consists of three picture quality layers. The lowest layer 810 is indicated by quality_id, Q=0 where the picture can be reconstructed without relying on picture in other layer picture. The second layer 820 is indicated by quality_id, Q=1 where the picture reconstruction relies on one lower layer. The third layer 830 is indicated by quality_id, Q=2 where the picture reconstruction relies on two lower layer pictures. Any noise generated by frame compression at the first layer will propagate to the second and the third layers and noise generated by frame compression at the second layer will propagate to the third layer. Therefore, it is beneficial to select higher picture quality (larger compression ratio) to lower layer pictures and select lower picture quality (smaller compression ratio) to higher layer pictures.

FIG. 8 illustrates an example of adaptive frame compression incorporating an embodiment according to the present invention. The shaded pattern indicates that the picture is compressed using frame compression. As shown in example of FIG. 8, two lower layer pictures 810 and 820 are not compressed while the highest layer picture 830 is compressed. FIG. 8 illustrates an example of adaptive frame compression based on quality layer of a scalable video coding system by applying no compression to the first layer and the second layer and applying frame compression to the third layer. Nevertheless, the specific determination of compression ratios for various layers in this example shall not be construed as limitations to the present invention. A skilled person may practice the present invention by providing different frame compression control based on the quality layer of the scalable coding system. For example, the first layer may be uncompressed, the second layer may be slightly compressed and the third layer may use a lower compression ratio than the second layer.

Figure 9:
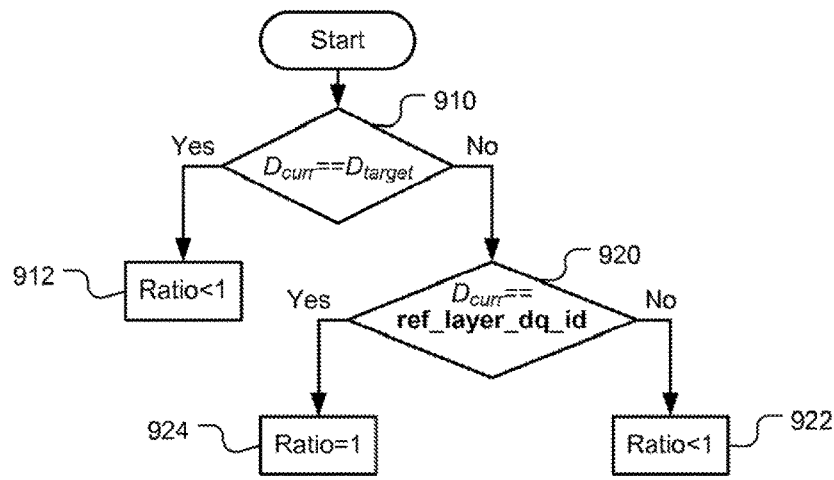
FIG. 9 illustrates one example of adaptive frame compression based on spatial layer syntax to improve compression quality according to one embodiment of the present invention.

An exemplary flowchart for adaptive frame compression based on spatial layer to improve compression quality incorporating an embodiment according to the present invention is shown in FIG. 9. Dr refers to the current layer as indicated by the current dependency_id and $D_{target}$ refers to the target layer as indicated by the target dependency_id. Test for whether the current layer is equal to the target layer is performed in step 910. If the current layer is equal to the target layer, it implies the current layer being a target layer and frame compression is applied to the current layer as shown in step 912; otherwise test for whether the current layer is equal to ref_layer_dq_id is performed in step 920. If the test result in step 920 is true which means the current layer is a reference layer of other layer, the current layer is not compressed as shown in step 924; otherwise the layer is compressed as shown in step 922. The flowchart in FIG. 9 illustrates one example of adaptive frame compression based on spatial layer syntax to improve compression quality according to one embodiment of the present invention. A skilled person may practice the present invention by rearranging the steps, modifying one or more steps, or adding one or more steps associated with adaptive control based on system status/parameters.

An embodiment of the present invention can also be applied to a decoder for a multi-view video coding system. FIG. 10 illustrates an example of multi-view video coding for 3D video where the 3D video is represented by two sequences 1010 and 1020 corresponding to a left view and a right view. Usually, one view is treated as a base view which can be coded using conventional video coding while the other view is treated as a target view which can be coded using inter-view prediction. The example shown in FIG. 10 designates the left view as the base view and applies regular video sequence coding such as H.264/AVC to compress the video sequence corresponding to the base view. The picture types for a segment of frames 1011 through 1017 of the base view are shown in FIG. 10, where frames 1011 and 1017 are I-frames and others are B-frames. Video coding of the target view can use inter-view prediction with the base view as a predictor. The corresponding frames for the target view are labeled from 1021 through 1027 as shown in FIG. 10. Frames 1021 and 1027 are predicted using corresponding inter-view frames 1011 and 1017 respectively. Accordingly, frames 1021 and 1027 are coded as P-frames. Other frames are coded as B-frames where prediction of the B-frames in the target view may be based on frames in the base view and/or previously coded frames in the target view.

The B-frames in the target view may or may not be used by other frames in the target view as reference frames. If a B-frame in the target view is not used by other frames in the target view as a reference frame, the B-frame can be compressed using frame compression to improve compression quality. In the example of FIG. 10, frames 1022, 1023, 1025 and 1026 are non-referenced B-frames and are compressed using frame compression as shown in the shaded pattern. Frame 1024 in the target view is used by other frames for reconstruction and is stored in an uncompressed form in the frame buffer. FIG. 10 illustrates an example of adaptive frame compression for a decoder in a multi-view coding system, where the adaptive frame compression control is based on the view layer and reference picture indication, nal_ref_idc. A skilled person in the field may practice the present invention by determining the adaptive frame compression control based a combination of the view layer and one or more bitstream syntax elements. Furthermore, various compression ratios may be used for frames compressed by adaptive frame control to improve compression quality.

An embodiment of the present invention can also be applied to a decoder for a multi-stream video coding system. FIGS. 11A and B illustrate two examples of multi-stream system: picture-in-picture arrangement 1100 and video conference arrangement 1150. In the example of picture-in-picture arrangement, the multi-stream data comprises a bitstream associated with a main picture and a bitstream associated with a sub-picture. Main picture 1102 usually covers the whole display area while sub-picture 1104 usually covers a smaller display area. FIG. 11A shows that main picture 1102 is an HDTV picture with 1920×1080 resolution while sub-picture 1104 is a SIF picture with 640×480 resolution. Both the main picture bitstream and the sub-picture bitstream may correspond to HDTV signals from two different TV channels. However, while the decoded HDTV signal for the sub-picture may have the same high resolution as the main picture, the decoded HDTV signal for the sub-picture will be displayed in reduced size. Any noise due to frame compression will be less visible. Accordingly, it is beneficial to apply frame compression to the sub-picture instead of the main picture to improve the compression quality.

FIG. 11B illustrates an example of video conference arrangement comprising a video window 1154 for a remote site and a video window 1156 for a local site on the same display area 1152. Usually the display window for the local site is for monitoring purpose and a reduced window size is used. On the other hand, seeing the video from the remote site is the main purpose of video conferencing. Therefore, a larger display window is usually used for the remote site. The display window sizes used in the example of FIG. 11B are 720×480 and 320×240 for the remote site and the local site respectively. Since the display window for the local site is for monitoring purpose, the video for local display usually is derived from the bitstream transmitted from the local site. The decoded local video may have the same high resolution as the remote site. However, the decoded local video is displayed on the screen in reduced resolution. Any noise due to frame compression will be less visible. Accordingly, it is beneficial to apply frame compression to the local video instead of the remote video to improve the compression quality.

Embodiment of adaptive frame compression based on system information and/or bitstream syntax to improve compression quality may be implemented in various hardware, software codes, or a combination of both. For example, an embodiment of the present invention can be multiple processor circuits integrated into a video compression chip or program codes integrated into video compression software to perform the processing described herein. An embodiment of the present invention may also be program codes to be executed on a computer CPU having multiple CPU cores or Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding, comprising:
receiving a video bitstream;
decoding the video bitstream to generate a reconstructed frame;
determining whether to re-compress the reconstructed frame for buffering based on a characteristic of the reconstructed frame that is provided in the video bitstream when a size of the reconstructed frame is greater than a first threshold; and
re-compressing the reconstructed frame and storing the re-compressed reconstructed frame into a buffer of a decoder system when the reconstructed frame is determined to be re-compressed for buffering, wherein
the characteristic of the reconstructed frame includes whether the reconstructed frame is a reference frame and an initial picture quantization parameter associated with the reconstructed frame, and
the determining whether to re-compress the reconstructed frame for buffering when the size of the reconstructed frame is greater than the first threshold comprises:
determining that the reconstructed frame is not to be re-compressed for buffering when the reconstructed frame is the reference frame and the initial picture quantization parameter is not greater than a second threshold.

2. The method of claim 1, wherein
the determining whether to re-compress the reconstructed frame for buffering when the size of the reconstructed frame is greater than the first threshold comprises:
determining that the reconstructed frame is to be re-compressed for buffering when the reconstructed frame is not the reference frame; and
determining that the reconstructed frame is to be re-compressed for buffering when the reconstructed frame is the reference frame and the initial picture quantization parameter is greater than the second threshold.

3. The method of claim 1, further comprising:
determining a re-compression ratio based on decoder system information of the decoder system or one or more syntax elements in the video bitstream, when the reconstructed frame is determined to be re-compressed for buffering.

4. The method of claim 3, wherein the decoder system information comprises a buffer size of the buffer or buffer occupancy of the buffer.

5. The method of claim 3, wherein the one or more syntax elements comprise reference frame indicator, the initial picture quantization parameter, picture type, or picture size.

6. The method of claim 3, wherein the one or more syntax elements comprise at least one of spatial layer information, quality layer information, view layer information for a multi-view video coding system, and stream identifier information for a multi-stream video coding system.

7. The method of claim 1, further comprising:
controlling the re-compressing the reconstructed frame by performing one or more of frame re-compression algorithm selection, frame re-compression parameter adjustment, or frame re-compression enabling.

8. The method of claim 1, further comprising:
decompressing the re-compressed reconstructed frame for generating recovered-reconstructed video data.

9. The method of claim 1, further comprising:
storing the reconstructed frame in the buffer without re-compression when the reconstructed frame is determined not to be re-compressed for buffering and is the reference frame.

10. A decoder system, comprising:
circuitry configured to:
   generate a reconstructed frame from a video bitstream;
   determine whether to re-compress the reconstructed frame for buffering based on a characteristic of the reconstructed frame that is provided in the video bitstream when a size of the reconstructed frame is greater than a first threshold; and
   re-compressing the reconstructed frame when the reconstructed frame is determined to be re-compressed for buffering; and
a buffer configured to store the re-compressed reconstructed frame, wherein
the characteristic of the reconstructed frame includes whether the reconstructed frame is a reference frame and an initial picture quantization parameter associated with the reconstructed frame, and
the circuitry is further configured to:
   determine that the reconstructed frame is not to be re-compressed for buffering when the reconstructed frame is the reference frame and the initial picture quantization parameter is not greater than a second threshold.

11. The decoder system of claim 10, wherein
the circuitry is further configured to:
   determine that the reconstructed frame is to be re-compressed for buffering when the reconstructed frame is not the reference frame; and
   determine that the reconstructed frame is to be re-compressed for buffering when the reconstructed frame is the reference frame and the initial picture quantization parameter is greater than the second threshold.

12. The decoder system of claim 10, wherein the circuitry is further configured to:
   determine a re-compression ratio based on decoder system information of the decoder system or one or more syntax elements in the video bitstream, when the reconstructed frame is determined to be re-compressed for buffering.

13. The decoder system of claim 12, wherein the decoder system information comprises a buffer size of the buffer or buffer occupancy of the buffer.

14. The decoder system of claim 12, wherein the one or more syntax elements comprise reference frame indicator, the initial picture quantization parameter, picture type, or picture size.

15. The decoder system of claim 12, wherein the one or more syntax elements comprise at least one of spatial layer information, quality layer information, view layer information for a multi-view video coding system, and stream identifier information for a multi-stream video coding system.

16. The decoder system of claim 10, wherein the buffer is further configured to:
store the reconstructed frame without re-compression when the reconstructed frame is determined not to be re-compressed for buffering and is the reference frame.

17. A method of video decoding, comprising:
receiving a video bitstream;
decoding the video bitstream to generate a reconstructed frame;
determining whether to re-compress the reconstructed frame for buffering based on a characteristic of the reconstructed frame that is provided in the video bitstream when a size of the reconstructed frame is greater than a first threshold; and
re-compressing the reconstructed frame and storing the re-compressed reconstructed frame into a buffer of a decoder system when the reconstructed frame is determined to be re-compressed for buffering, wherein
the characteristic of the reconstructed frame includes whether the reconstructed frame is a reference frame and an initial picture quantization parameter associated with the reconstructed frame, and
the determining whether to re-compress the reconstructed frame for buffering when the size of the reconstructed frame is greater than the first threshold comprises:
   determining that the reconstructed frame is to be re-compressed for buffering when the reconstructed frame is not the reference frame; and
   determining that the reconstructed frame is to be re-compressed for buffering when the reconstructed frame is the reference frame and the initial picture quantization parameter is greater than the second threshold.

18. A decoder system, comprising:
circuitry configured to:
   generate a reconstructed frame from a video bitstream;
   determine whether to re-compress the reconstructed frame for buffering based on a characteristic of the reconstructed frame that is provided in the video bitstream when a size of the reconstructed frame is greater than a first threshold; and
   re-compressing the reconstructed frame when the reconstructed frame is determined to be re-compressed for buffering; and
a buffer configured to store the re-compressed reconstructed frame, wherein
the characteristic of the reconstructed frame includes whether the reconstructed frame is a reference frame and an initial picture quantization parameter associated with the reconstructed frame, and
the circuitry is further configured to:
   determine that the reconstructed frame is to be re-compressed for buffering when the reconstructed frame is not the reference frame; and
   determine that the reconstructed frame is to be re-compressed for buffering when the reconstructed frame is the reference frame and the initial picture quantization parameter is greater than the second threshold.

* * * * *